United States Patent
Sato

[11] Patent Number: 5,131,596
[45] Date of Patent: Jul. 21, 1992

[54] DOUBLE BEARING FISHING REEL WITH FISHING LINE GUIDE MECHANISM

[75] Inventor: Jun Sato, Sakai, Japan

[73] Assignee: Shimano Industrial Company, Ltd., Osaka, Japan

[21] Appl. No.: 713,619

[22] Filed: Jun. 12, 1991

Related U.S. Application Data

[63] Continuation of Ser. No. 445,757, Dec. 4, 1989, abandoned.

[30] Foreign Application Priority Data

Dec. 9, 1988 [JP] Japan .......................... 63-160658[U]

[51] Int. Cl.⁵ .................... A01K 89/015; A01K 89/00
[52] U.S. Cl. .................................................. 242/279
[58] Field of Search ........................... 242/273–281, 242/158.3

[56] References Cited

U.S. PATENT DOCUMENTS

| | | | |
|---|---|---|---|
| 718,416 | 1/1903 | Bishop | 242/279 |
| 1,344,289 | 6/1920 | Case | 242/280 |
| 1,565,402 | 12/1925 | Schmid | 242/279 |
| 1,792,371 | 2/1931 | Greene | 242/276 |
| 2,706,096 | 4/1955 | Rufle | 242/276 |
| 3,796,395 | 3/1974 | Rankin, Jr. | 242/279 |
| 4,772,410 | 9/1988 | Sato | 242/279 |

FOREIGN PATENT DOCUMENTS 2650727 10/1977 Fed. Rep. of Germany ...... 242/279

Primary Examiner—Daniel P. Stodola
Assistant Examiner—John Q. Nguyen
Attorney, Agent, or Firm—Dickstein, Shapiro & Morin

[57] ABSTRACT

A double bearing fishing reel having a fishing line guide mechanism, in which an engaging member engageable with traverse grooves at a traverse shaft is held to a fishing line guide at the spool side with respect to the traverse shaft and the engaging member is oriented toward the spool so as to eliminate a downward projection, thereby enabling side frames at the reel to be small-sized.

7 Claims, 2 Drawing Sheets

DOUBLE BEARING FISHING REEL WITH FISHING LINE GUIDE MECHANISM

This is a continuation of application Ser. No. 07/445,757, filed Dec. 4, 1989, now abandoned.

FIELD OF THE INVENTION

The present invention relates to a double bearing fishing reel, and more particularly to a double bearing fishing reel which rotatably supports a spool between a pair of side frames and is provided with a fishing line guide mechanism for axially guiding the spool a fishing line to be wound thereon.

BACKGROUND OF THE INVENTION

The conventional double bearing fishing reel is provided at the front side, in the direction for drawing the line out of the spool, with the fishing line guide mechanism so as to axially guiding the spool the line to be wound thereon, thereby uniformly winding up the line throughout the whole axial length of the spool.

Such a fishing line guide mechanism, as disclosed in the Japanese Utility Model Publication Gazette No. Sho 57-22,541, is so constructed that between a pair of side frames rotatably supporting the spool, a traverse shaft having transverse grooves at the outer periphery is rotatably supported axially of the spool so as to associate the traverse shaft with a drive mechanism for the spool, a fishing line guide is slidably supported around the traverse shaft through a tubular shaft, between the side frames is mounted a guide rod with a stripe guide portion for regulating rotation of the fishing line guide, the fishing line guide is provided with a fishing line guide portion and a lock member engageable with the stripe guide portion so as to restrain the rotation of fishing line guide, and an engaging member having an engaging portion engageable with the traverse grooves at the tranverse shaft is held to the fishing line guide, so that the traverse shaft rotates to move the fishing line guide in reciprocation through the engaging member engageable with the traverse grooves at the traverse shaft, thereby guiding to the spool the fishing line to be wound up onto the spool.

The engaging member in the aforesaid fishing reel, as used in the prior art, is separate from the fishing line guide and detachably mounted to a holding portion at the fishing line guide through a cap, and cannot but project largely outwardly from the fishing line guide formed in the size required to a minimum.

The engaging member and cap having hitherto projected downwardly from the fishing line guide not to be viewed from the exterior. In such case, the cap, when the reel is mounted on a fishing rod, must not interfere therewith, and the traverse shaft must be disposed apart from the mounting portion to the fishing rod. Therefore, the side frames are larger in the size to that extent, thereby creating the problem in that an angler has a hard time gripping the side frame together with the fishing rod to fish.

Since the engaging member and cap project downwardly from the fishing line guide, when the angler grips the side frame together with the fishing rod for fishing, the cap may touch the finger of his hand gripping the side frame following the reciprocation of the fishing line guide, thus making it harder to grip the reel body.

SUMMARY OF THE INVENTION

An object of the present invention is to provide a double bearing fishing reel which is not restricted by the fishing line guide to configuration of the side frame so that it is easier to grip. Hence, even when an angler grips the side frame together with the fishing rod for fishing, an engaging member and a cap provided at the fishing line guide do not touch the finger of his griping hand.

The present invention is characterized in that, in a double bearing fishing reel which rotatably supports a spool between a pair of side frames and has a fishing line guide mechanism for guiding axially of the spool a fishing line to be wound thereon, the fishing line guide mechanism is provided with a traverse shaft having traverse grooves and rotatable in association with rotation of the spool, an engaging member having an engaging portion engageable with the traverse grooves, a fishing line guide slidably supported to the traverse shaft and having a holding portion for holding the engaging member and a fishing line guide portion for guiding the fishing line, and guide means for regulating rotation of the fishing line guide so as to guide it axially of the traverse shaft, so that the holding portion for the fishing line guide is disposed at the spool side respect to the tranverse shaft and the engaging member supported to the holding portion is oriented toward the spool.

The fishing line guide may be provided with a cap for holding the engaging member. Since the engaging member or the cap is positioned at the spool side with respect to the traverse shaft and oriented toward the spool, the traverse shaft can be positioned with respect to the side frame, in other words, the fishing line guide can be positioned with respect the same, at the mounting side of the side of the side frame when mounted onto the fishing rod.

Accordingly, the side-frames can be small in size without being restricted to the fishing line guide. As the result, an angler can easily grip the side frame together with the fishing rod, and also the engaging member or the cap, when the side frame is gripped by the angler, can avoid touching the finger of his hand that is gripping the rod with side frame during the reciprocation of fishing line guide.

In the aforesaid construction, it is preferable that the guide means is formed of a guide member disposed at the spool side with respect to the traverse shaft, so that the engaging member or the cap engages with the guide member to guide the fishing line guide regulating its rotation. also, when the guide means is formed of a connecting member for coupling a pair of side frames, it is preferable that the number of parts is reduced and construction is simplified.

Furthermore, when the guide means is formed of a pair of guide members having stripe guide surfaces vertically opposite to each other so that the upper guide member covers above the engaging member (including the cap) oriented toward the spool, for the so-called thumbing of applying resistance against the rotation of spool by use of the thumb of the angler's hand gripping the side frame, the thumb can be prevented from touching the engaging member or the cap, thereby facilitating the thumbing.

The above and further object and novel features of the invention will more fully appear from the following detailed description when the same is read in connection with the acccompanying drawings.

DETAILED DESCRIPTION OF THE INVENTION

Figure 1:
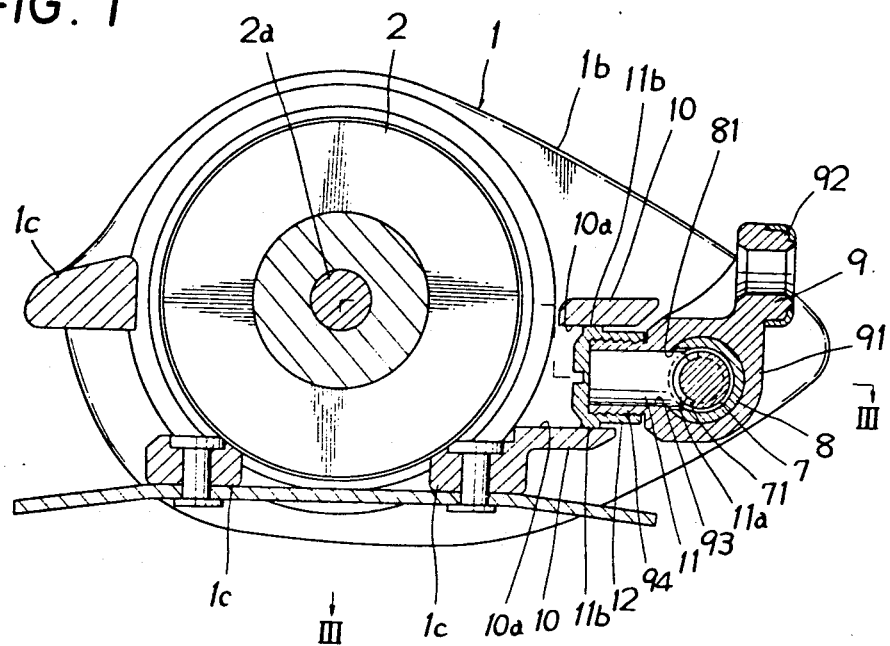
FIG. 1 is a longitudinally sectional side view of an embodiment of a double bearing fishing reel of the invention.

The fishing reel shown in the drawing is so constructed that a spool 2 fixed to a spool shaft 2a rotatably supported between a pair of side frames 1a and 1b at a reel body 1 through a pair of bearings 20 and 21 is disposed between the side frames 1a and 1b, at a side of one side-frame 1a is provided a drive mechanism comprising a handle shaft 3 rotatably supported to the side frame 1a, a driving gear 4 supported to the handle shaft 3, a pinion 5 supported rotatably and axially movably to the spool shaft 2a and engageable with the driving gear 4, and a clutch 6 provided between the pinion 5 and the spool shaft 2a, so that the handle shaft 3 is rotated to rotate the spool 2 for winding up thereon a fishing line. At the front of the spool 2 is rotatably supported a traverse shaft 7 having at the outer periphery thereof traverse grooves 71 and extending axially of the spool 2, the traverse shaft 7 associates with rotation of the driving gear 4 through an interlocking gear, a tubular shaft 8 having an axially extending window 81 is mounted around the traverse shaft 7, and a fishing line guide 9 is slidably supported to the tubular shaft 8.

In the embodiment shown in the drawing, between the side frames 1a and 1b and at the spool 2 side with respect to the traverse shaft 7 are disposed a pair of guide members 10 each having a flat stripe guide surface 10a for regulating the rotation of fishing line guide 9. The fishing line guide 9 is provided with a holding portion for holding therethrough an engaging member 11 having an engaging portion 11a engagable with the traverse grooves 71 at the traverse shaft 7, and a cap 12 for locking the engaging member 11 screws with the holding portion, the cap 12 engaging with the flat stripe guide surfaces 10a to prevent rotation of the fishing line guide 9.

In the above-mentioned construction, one construction, one guide member 10 serves as one of connecting members 1c for coupling the side frames 1a and 1b, the connecting member 1c integral therewith. The guide members 10 are open therebetween at the front and rear sides and provided at the vertical opposite surfaces with the flat stripe guide surfaces 10a respectively.

The fishing line guide 9 is provided with a boss 91 having a fitting bore slidably fitting onto the outer periphery of tublular shaft 8 and a fishing line guide portion 92 upwardly extending from the upper surface of boss 91. At the rear surface of the boss 91, in other words, at the spool 2 side with respect to the traverse shaft 7, is provided the holding portion comprising a through bore 93 for receiving therein the engaging member 11 and a threaded cylinder 94 projecting from around the through bore 93 toward the spool 2. The engaging member 11 comprises a pin having at the front surface the engaging portion 11a, and is inseted into the threaded cylinder 94, so that engaging portion 11a enters into the tubular shaft 8 through the window 81, thereby engaging with the traverse grooves 71.

The engaging member 11 held into the holding portion is oriented toward the spool 2 and opposite thereto at the rear surface.

The cap 12 is formed of a bottomed cylinder and detachably screws with the threaded cylinder 94, whereby the engaging member 11 is locked not to escape from the holding portion. Also, the cap 12 is provided with flat portions 11b engagable with the flat stripe guide surfaces 10a respectively, and engages with the guide members 10 to regulate rotation of the fishing line guide 9, whereby the fishing guide 9 can be guided axially of the spool shaft 2a.

In addition, in the embodiment shown, the reel body 1 integrally molds the pair of side frames 1a and 1b and three connecting members 1c including the aforesaid one 1c so as to form its framework and a cover 1d is attached to the side frame 1a, which is not defined to the construction of the embodiment.

As seen from the above, the holding portion at the fishing line guide 9 is disposed at the spool 2 side with respect the traverse shaft 7, and the engaging member 11 held to the holding portion and the cap 12 are oriented toward the spool 2 and do not project downwardly, whereby the traverse shaft 7, as shown in FIG. 1. approaches the mounting side of the reel body 1 to the fishing rod, so that a distance between the traverse shaft 7 and the mounting surface of the reel body 1 to the fishing rod can be reduced to that extent.

Figure 2:
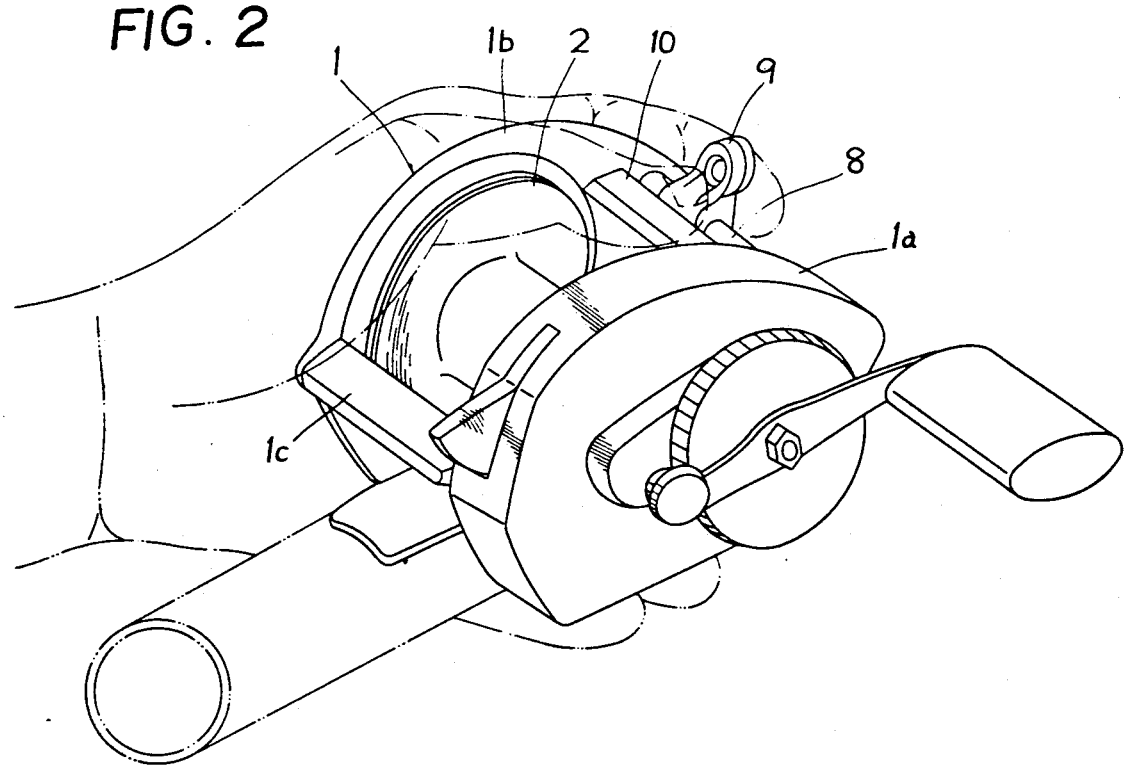
FIG. 2 is a perspective view thereof.
Figure 3:
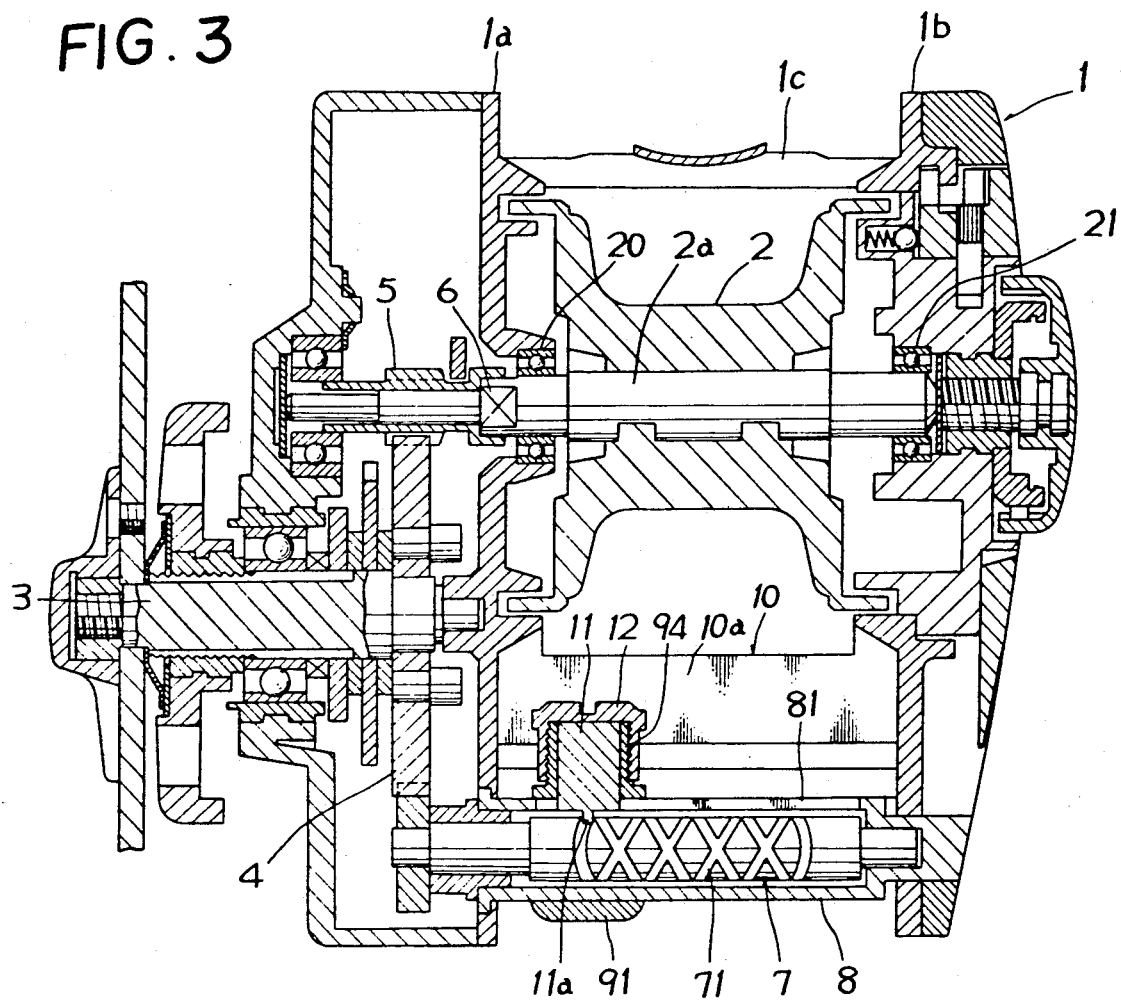
FIG. 3 is a sectional view taken on the line III—III in FIG. 1.

Accordingly, the side frames 1a and 1b can be small-sized to that extent and the angler is easy to grip the reel body 1 together with the fishing rod as shown in FIG. 2.

In the embodiment shown in the drawing, in a case where the angler grips the upper portion and front portion of reel body 1 at the side frame 1b side together with the fishing rod when the fishing line is wound up for the fishing as shown by the chain line in FIG. 2, the guide members 10 for regulating the rotation of fishing line guide 9 are positioned at the spool 2 side with respect to the traverse shaft 7. Moreover, since the engaging member 11 and cap 12 engage with the flat stripe guide surfaces 10a and are covered by the upper guide member 10, even when the fishing line guide 9 reciprocates, there is no fear that the cap 12 touches the finger of angler's hand gripping the front portion of reel body 1. Also, when the angler applies onto the surface of wound line on the spool 2 the tip of his thumb put on the upper portion or reel body 1 for thumbing, the thumb is prevented from being hit by the fishing line guide 9. Also it is possible to apply resistance against draw out of the line by directly putting, by the angler's thumb, the line drawn out from the spool 2 to the fishing line guide 9 onto the upper surface of the upper guide member 10.

Alternatively, the engaging member 11 may project outwardly from the cap 12 so that the projections may engage with the flat stripe guide surfaces 10a respectively.

Also, only one guide member may alternatively be useable and may be separate from the connecting member 1c.

Figure 4:
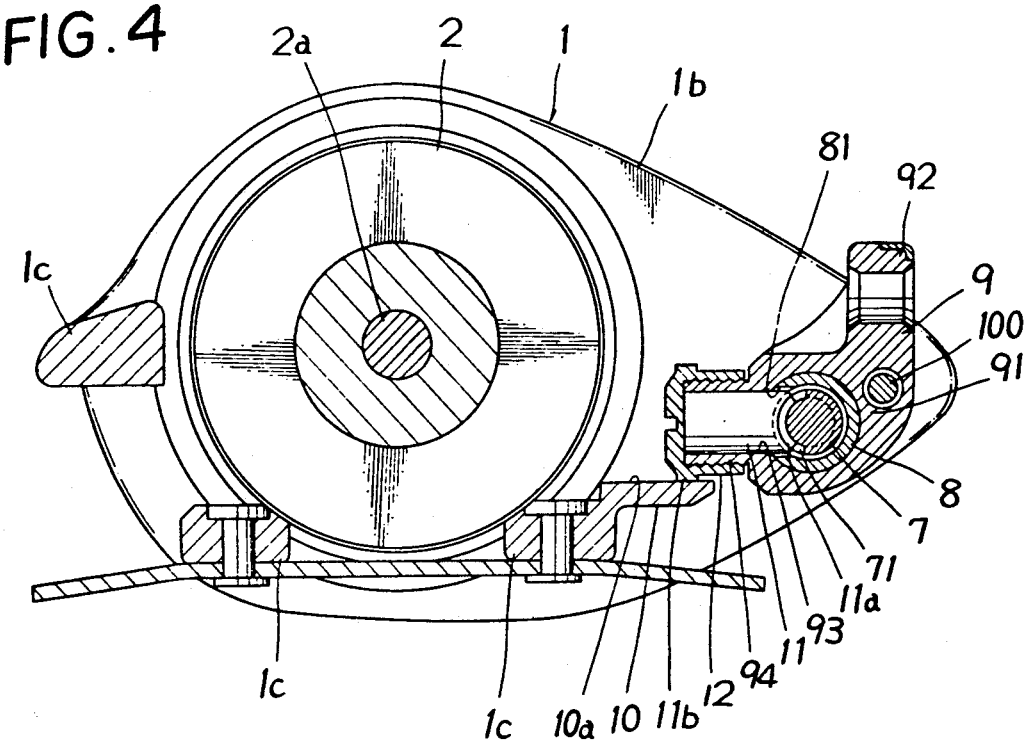
FIG. 4 is a longitudinally sectional side view of a modified embodiment of the invenetion, corresponding to FIG. 1.

Alternatively, as shown in FIG. 4, a rod-like guide member 100 may be used and a through bore extending in parallel to the traverse shaft 7 may be provided at the fishing line guide 9 so that the guide member 100 may be inserted into the through bore, thereby regulating the rotation of fishing line guide 9 to be guided.

Although several embodiments have been described, they are merely exemplary of the invention and not to be constructed as limiting, the invention being defined solely by the appended claims.

What is claimed is:

1. A double bearing fishing reel, comprising:
a pair of side frames;
a reel mount positioned below said fishing reel for holding said fishing reel to a rod;
a spool supported between the side frames;
a driving mechanism for driving the spool;
a fishing line guide mechanism supported between the side frames for guiding the winding of a fishing line onto the spool, said fishing line guide mechanism comprising:
(a) a traverse shaft which rotates in association with said driving mechanism, the traverse shaft having traverse grooves;
(b) an engaging member having an engaging portion that engages with the traverse grooves; and
(c) a fishing line guide having: (i) a holding portion that is slidably supported to the traverse shaft for holding the engaging member and maintaining the engaging portion in the traverse grooves; and (ii) a fishing line guide portion having a line guide hole for guiding the fishing line; wherein said holding portion and said engaging member are positioned between the traverse shaft and the spool with the engaging member being oriented towards the spool;
a guide means provided between the side frames for regulating the rotation of the fishing line guide about said traverse shaft so that said fishing line guide moves axially along said traverse shaft upon rotation of said traverse shaft due to the engagement of the engaging portion with the traverse grooves, but does not rotate about said traverse shaft; and
at least a first connecting member for connecting the pair of side frames, said first connecting member having an uppermost flat surface, said first connecting member being disposed between the spool and the traverse shaft, wherein said holding portion of said fishing line guide is located between said first connecting member and said reel mount, wherein said first connecting member is located substantially below said line guide hole of said fishing line guide portion, and wherein said fishing reel has no other connecting member for connecting said side frames between said uppermost flat surface of said first connecting member and an upper portion of said spool, whereby said first connecting member protects an angler's finger from engagement with said fishing line guide, and whereby the fishing line can be thumbed on said uppermost flat surface of said first connecting member.

2. A double bearing fishing reel according to claim 1, further comprising a second connecting member located on an opposite side of the holding portion of the fishing line guide with respect to the first connecting member, said second connecting member having a flat surface facing said holding portion and being disposed between the spool and the traverse shaft, the first and second connecting members forming a pair of connecting members, each having a flat guide surface for regulating rotation of the fishing line guide.

3. A double bearing fishing reel according to claim 2, wherein the engaging member of the fishing line guide mechanism engages the pair of connecting members for regulating rotation of the fishing line guide.

4. A double bearing fishing reel according to claim 2, wherein the fishing line guide further comprises a cap member that holds the engaging member to the holding portion, the cap member engaging the pair of connecting members for regulating rotation of the fishing line guide.

5. A double bearing fishing reel according to claim 1, wherein the fishing line guide further comprises a through bore that extends in the direction of the traverse shaft, the guide means extending through the through bore.

6. a double bearing fishing reel according to claim 5, wherein said first connecting member extends over the engaging member.

7. A double bearing fishing reel according to claim 1, wherein said reel mount has an engagement surface for engaging the rod, and wherein said holding portion has a through bore (93) for receiving said engaging member (11), said through bore having a central longitudinal axis which is generally parallel to said engagement surface of said reel mount.

* * * * *